March 18, 1941.  A. W. GOULD  2,235,744
JUICE EXTRACTOR
Filed Dec. 30, 1937   3 Sheets-Sheet 1
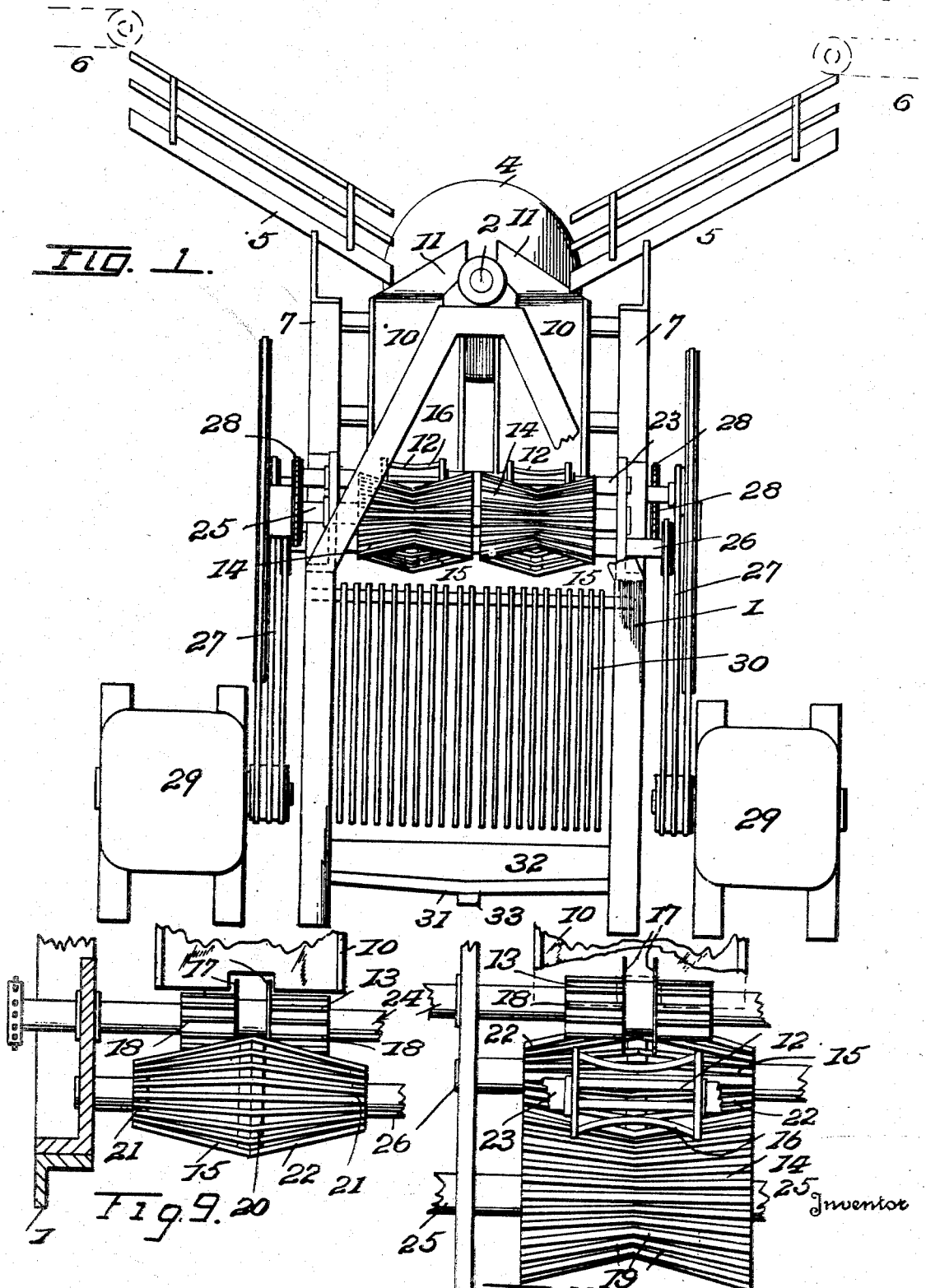
Inventor
Albert W. Gould
By Jno Laurie
Attorney March 18, 1941.  A. W. GOULD  2,235,744
JUICE EXTRACTOR
Filed Dec. 30, 1937   3 Sheets-Sheet 2
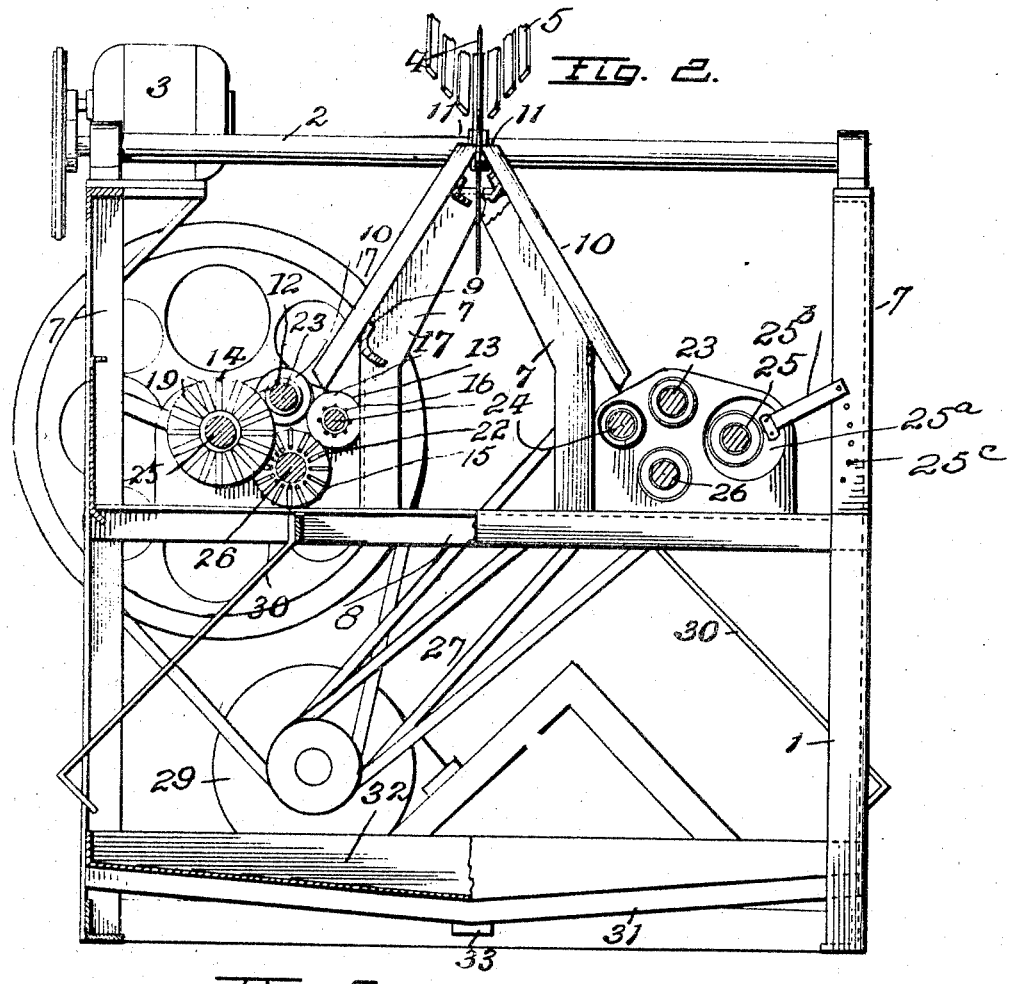
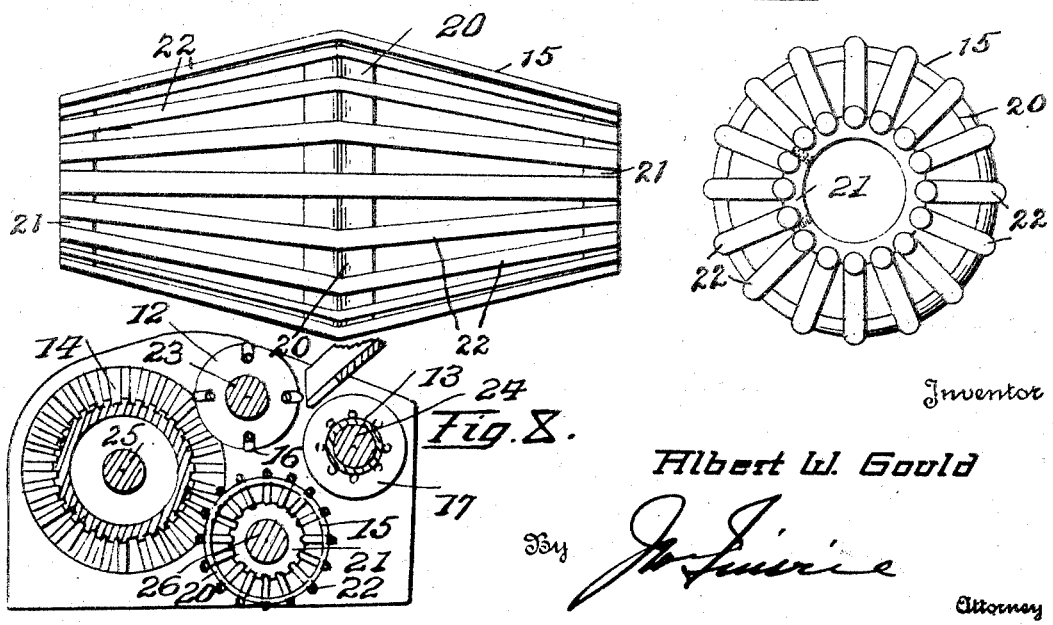
Inventor
Albert W. Gould
By
Attorney March 18, 1941.   A. W. GOULD   2,235,744
JUICE EXTRACTOR
Filed Dec. 30, 1937   3 Sheets-Sheet 3

Inventor
Albert W. Gould
By
Attorney

Patented Mar. 18, 1941

2,235,744

UNITED STATES PATENT OFFICE 2,235,744

JUICE EXTRACTOR

Albert W. Gould, Loughman, Fla.

Application December 30, 1937, Serial No. 182,605

2 Claims. (Cl. 146—3)

This invention is directed to an improvement in juice extractors for citrus fruits, being directed primarily to a machine having large capacity and which is substantially automatic throughout without unnecessary rupture of the juice cells and without undue bruising of the pulp and rind.

The primary object of the present invention is the production of a juice extractor in which the fruit is delivered by means of a trough to a revolving or other blade by which the fruit is divided into two sections or halves; and wherein the fruit so divided is delivered to a means for centering the fruit, and thereafter to a means by which the under surface of the rind of the fruit half is split for weakening the rind and permitting it to flatten out for immediately subsequent delivery to a means for extracting the juice.

A further object of the invention is the provision of cooperating elements whereby the actual extraction of the juice is accomplished, with such elements operating at relatively different speeds materially favoring the actual extracting element to insure substantially complete extraction of the juice without undue injury to either the rind or pulp of the fruit.

A further object of the invention is the provision of a so-called retainer and a so-called extorter, the former operating to feed the halved fruit to insure action of the extorter thereon for the extraction of the juice, the extorter being operated at several times the speed of the retainer to feed the halved fruit at a relatively slow speed past and in contact with the rapidly driven extorter to insure substantially complete juice extraction without undue rupture of the juice cells and with little if any bruising of the pulp or the rind.

A further object of the invention is the provision of an extorter of double truncated cone shape having a surface formation made up of rods of circular form and smoothly polished surface, wherein the shape of the fruit may be more or less accommodated by the shape of the extorter and wherein the rods will serve to create, particularly through the differential speed of the extorter with respect to the retainer, a rapid pressing movement for effective juice extraction.

A further object of the invention is the provision of a retainer for cooperation with the extorter constructed of a shape complementary to that of the extorter and provided with longitudinally ranging fins or ridges which engage the skin surface or rind of the fruit and compel a feeding movement of the fruit with respect to the extorter through which, by reason of the relatively low speed of the retainer, the movement of the fruit is retarded with respect to the movement of the extorter, to thereby permit a complete effective operation of the extorter during the relatively slow feeding movement controlled by the retainer.

A further object of the invention is the provision of means receiving the fruit in advance of the extracting operation and including cooperating elements, one of which centers the fruit with respect to the other, referred to as an exciter, with the latter constructed of rotating knife blades with longitudinally ranging ridged shoulders on either side of the blades. The exciter is designed to serve to force the fruit toward and into cooperation with the extracting means, with the knives of such exciter serving to split the under side of the rind of the halved fruit for the purpose of weakening the rind and permitting it to flatten out for appropriate feeding movement by the retainer.

A further object of the invention is the provision of means by which, following the extracting operation, the extracted juices are delivered to an appropriate chamber-like area for collection and the pulp and rind are delivered to a grill for discharge to a conveyor.

The invention is illustrated in the accompanying drawings, in which:

Figure 1 is a view in end elevation of the improved juice extractor, the extracting means being shown in duplicate, with a portion broken away for the sake of clearness.

Figure 2 is a sectional view, partly in elevation, illustrating the relation of the extracting elements.

Figure 6 is a plan view of the extorter.

Figure 7 is an end view of the same.

Figure 8 is a detail enlarged section of a unit of the juice extractor.

Figure 9 is a detail end view of the exciter and extorter to illustrate their relation.

Figure 10 is a plan view of one of the juice extracting units.

Figure 3:
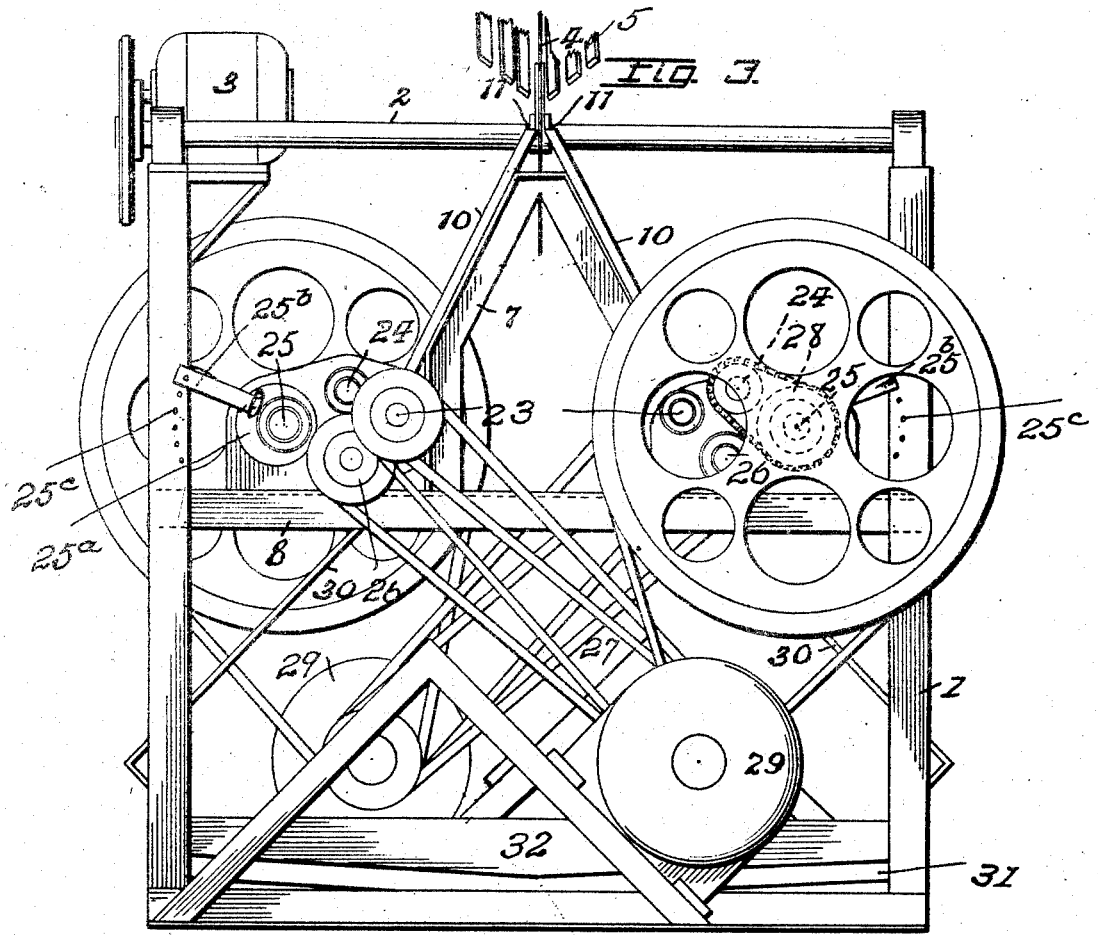
Figure 3 is a side elevation of the machine.

The improved juice extractor is made up of skeleton frame including appropriately proportioned and sized bars 1 interconnected and braced in any desired or appropriate manner to provide a frame to support the operating elements, which frame may, of course, be of any desired size and of any appropriate or desired material. Supported centrally and longitudinally of the frame at the upper end is a shaft 2 which may be independently driven by a motor 3 supported on the frame and geared to the shaft. At the center of the shaft is fixed a circular blade or knife 4 by means of which the fruit delivered to the machine is cut in halves.

The fruit is delivered to the machine, and more particularly to the knife, by V-shaped troughs 5, one at each side of the machine, and to which the fruit is delivered by conventional conveyors 6. The troughs 5 are inclined downwardly from the conveyor to the edge of the knife, the inclination being at approximately 30° to the horizontal and serving by this inclination and V-shape to deliver fruit to the knife so that it may be cut by the knife into approximate halves.

A V-shaped frame 7 is supported on transverse frame bars 8 located approximately mid-height of the machine, and the frames 7, one of which is located adjacent to each end of the machine, are connected by plates 9 to provide a support for guide troughs 10 which underlie the cutting area of the knife and direct the halved fruit to the juice-extracting elements. These guide troughs 10 are arranged in spaced relation on each side of the axis of the knife and extend above that axis with their upper edges 11 inclined upwardly toward the axis of the knife in opposition to the inclination of the troughs 5. This upward inclination of the respective guide troughs serves an important function in that they serve to retard the advance of the fruit and form with the discharge ends of the troughs a substantially V-shaped formation which will serve to more or less pocket the fruit and hold it against displacement during its gravital advance to insure appropriate and complete cutting by the knife.

Of course, as the knife divides the fruit in half, there is a guide trough 10 on each side of the vertical plane of the knife to receive the respective halves of the fruit and as the machine as illustrated is directed for handling fruit delivered from each side, there will, of course, be guide troughs 10 duplicated on each side, each directing the respective halves of the simultaneously cut fruit to the extracting means which is duplicated at the bottom of each trough. Each of the guide troughs inclines downwardly and outwardly with respect to the vertical plane of the knife, so that the respective halves of the two fruit being simultaneously cut and on one side of the knife are delivered to different extracting means on different guide troughs.

The fruit handling means arranged in duplicate below each opposed pair of guide troughs 10 includes a centering element 12, an exciter 13, a retainer 14 and an extorter 15. The centering element 12, indicated more particularly in Figures 8 and 10, is an annular body of a length to underlie the lower end of a guide trough 10 and is provided with concaved ribs 16, so that the fruit halves delivered from the guide troughs are properly centered and positioned.

The exciter 13 comprises spaced rotating blades 17 with longitudinally extending ridges or projections 18 projecting outwardly from the knives. As the fruit is centered by the element 12, the exciter, through cooperation of the ridges 18 with the fruit, forces the fruit toward the actual extracting elements, the knives 17 serving the purpose of superficially slitting the under side of the halved fruit during its advance for the purpose of weakening the rind and allowing it to flatten out during the juice-extracting operation.

Figure 4:
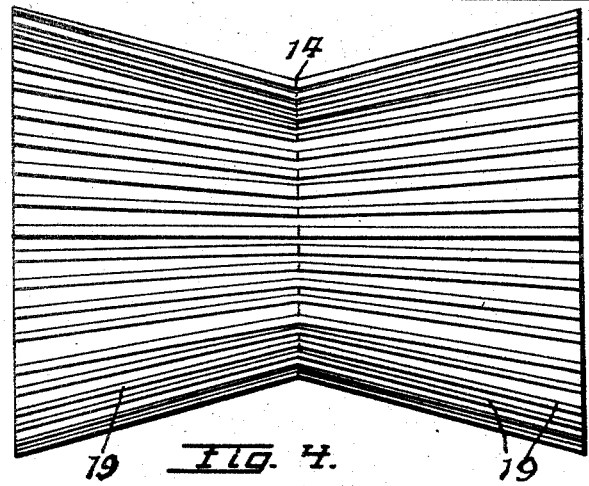
Figure 4 is a plan view of the retainer.
Figure 5:
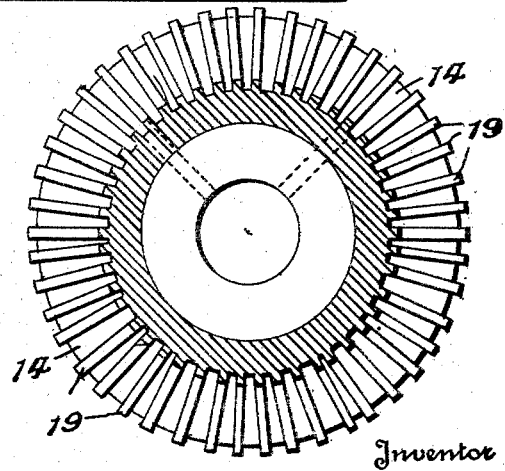
Figure 5 is a transverse section of the same.

Below and at one side of the exciter is arranged the retainer 14 which is illustrated more particularly in Figures 4 and 5 of the drawings. This retainer, as shown, comprises an elongated element mounted for rotation, of double truncated cone formation with the smaller ends of the cones united at the transverse center of the element so that the element as a whole is of less diameter at its transverse center than at its ends. The surface of the retainer is formed of narrow longitudinally extending fins or ridges 19.

Below the exciter and cooperating with the retainer is the juice-extracting element 15, hereinafter referred to as the extorter. This element is of complementary form to that of the retainer with which it cooperates, having its transverse center of greater diameter than its ends, the angular relation corresponding to the angular relation of the retainer. The extorter element comprises a central annular member 20 and annular end members 21 connected by a series of rods 22 which are welded to the members 20 and 21, with such rods forming the exterior surface of the extorter. The rods are round and definitely smooth or free of projection and the space within the series of rods between the central member 20 and each end member 21 is wholly free and open.

The centering members 12 are mounted upon a shaft 23, the exciters 13 are mounted upon a shaft 24, the retainers 14 are mounted upon a shaft 25, and the extorters 15 are mounted upon a shaft 26. The shaft 25 is mounted in eccentric bearings 25ᵃ and from each bearing extends an arm 25ᵇ having a stud which may engage any one of a series of openings 25ᶜ when the bearing is adjusted. By this arrangement the relation between the shafts 24 and 25 may be adjusted. These shafts are connected through suitable belting 27 and gearing 28 to be driven from motors 29 and the relation of the drive, or more particularly the speed of rotation, between the retainers and their cooperating extorters is a particularly important feature of the present invention.

The retainers are driven at a much lower speed than are the extorters and an impression of the relative speeds may be gained from the statement that the extorter may be driven at a speed of from 1800 to 2500 R. P. M. and the retainers at a speed approximating 150 to 300 R. P. M. The advantage of this differential speed and the purpose gained thereby will be explained more in detail later.

Depending from the frame bars 8 and extending beyond the frame are skeleton grills 30 which are downwardly and outwardly inclined and which receive the pulp and rind from the extractor and deliver the same to refuse conveyors for discharge purposes. The lower end of the frame is provided with supporting bars 31 on which is supported a metallic receptacle 32 of the full length and width of the frame and fully open at the top to receive the extracted juice which may be delivered through an outlet 33 for use, the bottom of the receptacle 32 inclining toward the discharge outlet.

In operation, fruit delivered through the troughs 5 is fed by gravity to the knife and retarded in movement under the influence of the knife by the upwardly inclined edges of the guide troughs 16. The fruit thus centered and halved by the knife has each half delivered by the guide troughs 16 to the extracting apparatus. This fruit half is first centered by the centering elements 12 and as centered is presented to the exciter which advances the fruit through the medium of the ridges 16 while the knives 17 of the exciter slit or cut the under side of the halved fruit to weaken the rind and permit the fruit to be flattened out between the retainer and extorter.

The halved fruit then passes between the retainer and extorter. The retainer serves to flatten out in a more or less degree the rind of the fruit, which flattening is facilitated by the knives 17 of the exciter and the round smooth rods 22 of the extorter, reaching the thus exposed pulp of the fruit, tend in effect to squeeze out the juices. It is to be particularly remembered that the extorter is driven at a very much higher speed than the retainer. In this way the retainer serves to retard the travel of the fruit while the extorter, by its extremely rapid rotation, causes the rods of the extorter to extract the juices.

It is rather difficult to explain the exact phenomena developed incident to the relative rotation of the retainer and extorter which contributes to an effective extraction of the juices without unduly disturbing the pulp or breaking down the oil cells, which would liberate the skin oil so injurious to canned citrus juices. It is believed, however, that incident to this relative rotation and due, of course, in some degree to the complementary formation of the retainer and extorter, there is a film of air which serves to exert a cushioned pressure upon the pulp in a manner to insure that the rods of the extorter, which are passing rapidly over the pulp, will, through this film of air, create the necessary juice extraction, but without breaking oil cells in the skin and pulp which would release oils detrimental to the taste and keeping qualities of canned citrus juices, insuring that the juice only is delivered by this operation, the pulp retained from separation from the rind, and the oil cells being comparatively intact.

This particular feature of the invention is of the maximum importance for the extractor is designed more particularly for use in the handling of large quantities of fruit for the purpose of canning or otherwise preserving the juice for commercial purposes. The more nearly the juice can be extracted in its natural form, without pollution by oil from broken oil cells, the more perfect the natural flavor of the preserved juice, with a resultant higher commercial value.

The juice extracted is delivered to the receptacle 32 while the pulp and rind are delivered to the grills 30 and carried away from the machine by the conveyors.

The machine is designed more particularly for large quantity juice extracting for canning and like purposes and while, if desired, it may be effective for smaller or domestic use, such is not the primary object of the apparatus although it is to be understood that such use may well fall within the scope of the invention.

The metallic parts employed are, of course, of a material to avoid in any way contaminating or affecting the fruit juices and, aside from this, any and all appropriate materials may be employed, and no restriction as to such material or relative sizes or proportions of the various parts is intended either by the description or illustration.

What is claimed to be new is:

1. A juice extractor including a frame, a rotating knife in the upper portion of the frame, means for feeding the fruit to the knife to divide the fruit in halves, a trough for each half leading from the knife and causing the divided halves to travel in different directions by gravity, and extracting means below the end of each trough for extracting the juice from the fruit, said extracting means including an initial exciter formed with cutters to cut into the rind of the half fruit only to slit the rind to permit the half fruit to be spread, a conical retainer to which the half fruit with the slit edge is fed, and a complementary-shaped extorter cooperating with the retainer and bearing against the pulp side of the half fruit to force the juice therefrom.

2. A construction as defined in claim 1, wherein the extorter includes a series of spaced bars mounted on a central frame and end frames, the central frame having a diameter exceeding that of the end frames, and the bars between the frames being wholly and completely uninterrupted transversely of the extorter.

ALBERT W. GOULD.